US005930481A

United States Patent [19]
Benhase et al.

[11] Patent Number: 5,930,481
[45] Date of Patent: Jul. 27, 1999

[54] SYSTEM FOR CONCURRENT CACHE DATA ACCESS BY MAINTAINING AND SELECTIVELY MERGING MULTIPLE RANKED PART COPIES

[75] Inventors: Michael Thomas Benhase; David Alan Burton; Marshall Heyman; John Norbert McCauley; Robert Louis Morton, all of Tucson, Ariz.

[73] Assignee: International Business Machines Corporation, Armonk, N.Y.

[21] Appl. No.: 09/079,491

[22] Filed: May 15, 1998

Related U.S. Application Data

[62] Division of application No. 08/570,280, Dec. 11, 1995, Pat. No. 5,774,682.

[51] Int. Cl.⁶ .............................. G06F 12/04; G06F 13/16
[52] U.S. Cl. ................... 395/200.79; 395/561; 711/113; 711/112; 711/118
[58] Field of Search .............................. 395/859, 200.61, 395/861, 561, 726, 200.79, 200.73, 800.24, 200.59, 835; 711/122, 112, 105, 113, 171, 114, 172, 5, 155, 100, 141, 118, 128, 207, 212, 121; 364/DIG. 1, DIG. 2

[56] References Cited

U.S. PATENT DOCUMENTS

| | | | |
|---|---|---|---|
| 4,489,378 | 12/1984 | Dixon et al. .............................. | 364/200 |
| 4,821,171 | 4/1989 | Calamari ................................. | 711/207 |
| 5,025,366 | 6/1991 | Baror ..................................... | 711/128 |
| 5,257,391 | 10/1993 | DuLac et al. ........................... | 395/800 |
| 5,276,848 | 1/1994 | Gallagher et al. ...................... | 711/121 |
| 5,345,565 | 9/1994 | Jibbe et al. ............................. | 395/325 |
| 5,392,244 | 2/1995 | Jacobson et al. ....................... | 365/200 |
| 5,418,925 | 5/1995 | DeMoss et al. ......................... | 395/425 |

*Primary Examiner*—Daniel H. Pan
*Attorney, Agent, or Firm*—Gray Cary Ware Freidenrich

[57] ABSTRACT

A system for providing multiple hosts with concurrent access to cached data by selectively generating, maintaining, modifying, and consolidating multiple versions of data items in cache memory to efficiently accommodate data access requests by the hosts. Data associated with a logical track is represented in cache by a number of cache track image parts. Each part represents one or more records in cache, where multiple parts may exist in cache for the same logical track. The provision of multiple parts supports concurrent access by multiple operations or "processes" to data associated with a track. Namely, each part is given a "status" selected from a predetermined catalog of statuses; the assigned status thus establishes the permissible manner of accessing that part. Depending upon a part's status, the part may be used by one process (e.g. Read) or by multiple processes concurrently (e.g. Read and Destage). Other part statuses dedicate a part to a single process (e.g. Write). Multiple parts, not being actively used by a process, may be combined by a merge function to represent the most current image of the track.

23 Claims, 5 Drawing Sheets

WRITE

DESTAGE

STAGE

READ

SYSTEM FOR CONCURRENT CACHE DATA ACCESS BY MAINTAINING AND SELECTIVELY MERGING MULTIPLE RANKED PART COPIES

This application is a division of application Ser. No. 08/570,280 filed on Dec. 11, 1995 and now U.S. Pat. No. 5,774,682.

BACKGROUND OF THE INVENTION

1. Field of the Invention

The present invention relates to the access of data in a storage subsystem by multiple hosts. More particularly, the invention concerns a system to provide multiple hosts with concurrent access to cached data by selectively generating, maintaining, modifying, and consolidating multiple versions of data items in cache memory to efficiently accommodate data access requests by the hosts.

2. Description of the Related Art

In storage subsystems that implement RAID architecture, disk resident data is protected from loss by a form of data redundancy known as "parity." This redundancy ensures that if a storage device fails, the data can still be reconstructed. Data sectors and parity sectors are distributed across the devices in the array. The data sectors and their corresponding parity sectors are grouped in such a way as to afford continuous availability and maximized update performance. New parity is calculated whenever a sector containing modified data is destaged.

To maintain consistency within the parity domain, the parity sectors must be updated at the same time as their respective data sectors; it is essential that the update of the data and parity sectors be atomic to ensure data integrity. This is accomplished by using a locking mechanism. The unit of data under control of the lock is known as a "segment." Depending upon the granularity of the lock, data availability and write access may be affected while a destage is in progress.

Generally, a storage subsystem's throughput is constrained unless that system inherently supports continuous data availability despite concurrent stage/destage operations and simultaneous access by multiple hosts. One problem in locking systems concerns the updating of data undergoing a destage operation. In particular, when modified data is being destaged, a lock may be applied to each segment (e.g. logical track) of the data. The subsystem will not accept a subsequent write to the segment until the lock is released, i.e. when the destage completes. The desired write operation is deferred by "control unit initiated command retry"; the command chain remains pending at the subchannel until the subsystem presents ending status. The busy subchannel will prevent any further operations for this logical device from being initiated by this host until the command chain is completed. As a result, data being destaged from cache may be accessible to host Read operations, but it cannot be updated for the duration of the destage due to the lock placed upon the data segment.

Another problem in known systems may occur with a partial-Read-miss. A Read-miss occurs when the cache cannot satisfy the host request. If a Read-miss occurs for a track that has modified data in cache, the modified data will be first destaged; when the destage completes, the track will be staged to cache to satisfy the Read request. The command chain remains pending at the subchannel until the data is available in cache. As a result, a partial-Read-miss may force destaging of modified data before the Read request can be satisfied, resulting in significant delays to host Read and Write operations.

The segment locking approach to cache management can be especially problematic with log structured array ("LSA") storage. In particular, destaging with LSA storage is typically not performed until a complete data segment is accumulated. Thus, when destaging does finally occur, it takes longer to complete. Therefore, other processes are put at a disadvantage to the destaging process, because the other processes cannot accurately anticipate the locking of the destaged data segment, and because the lock is maintained for longer to the exclusion of the other processes.

SUMMARY OF THE INVENTION

Broadly, the present invention concerns a system for providing multiple hosts with concurrent access to cached data by selectively generating, maintaining, modifying, and consolidating multiple versions of data items in cache memory to efficiently accommodate data access requests by the hosts. The cached data may originate from nonvolatile storage, such as an array of magnetic data storage disks. In this environment, data associated with logical tracks of the disks are represented in cache by a number of track parts ("parts"). Each part in cache memory represents one or more records of a track stored on disk. A part may represent some or all data fields of the represented records. Multiple parts existing in cache memory may include portions of the same logical track; however, it is possible for a track to be only partially represented in cache.

The facility to concurrently support multiple parts enables multiple operations or "processes" to simultaneously access data associated with a track. Namely, each part is given a "status" selected from a predetermined catalog of recognized statuses; the assigned status thus establishes the permissible manner of accessing that part. Depending upon a part's status, the part may be used by one process (e.g. Read) or by multiple processes concurrently (e.g. Read and Destaae). Other part statuses dedicate a part to a single process (e.g. Write).

At various times, the present invention manages part generation, attends to part maintenance, oversees part modification, and consolidates multiple parts corresponding to the same sector and track. For example, multiple "non-busy" parts may be combined by a merge function to represent the most current image of the track. A "non-busy" part is one that is not being actively used by any processes, where the number of processes actively using the part is indicated by a "number-of-users" attribute of the part.

The invention affords its users with a number of distinct advantages. Chiefly, the invention provides an efficient method for ensuring consistency of cached data. Moreover, the invention improves data throughput and response time by enabling multiple users to simultaneously access data. For example, the invention provides consistently high performance Fast Write response because destage operations have no effect on host Read or Write operations since device updates are performed transparently with respect to the host. Moreover, Write performance is improved significantly, especially over other implementations of RAID-5 architecture.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

STRUCTURE

Figure 1:
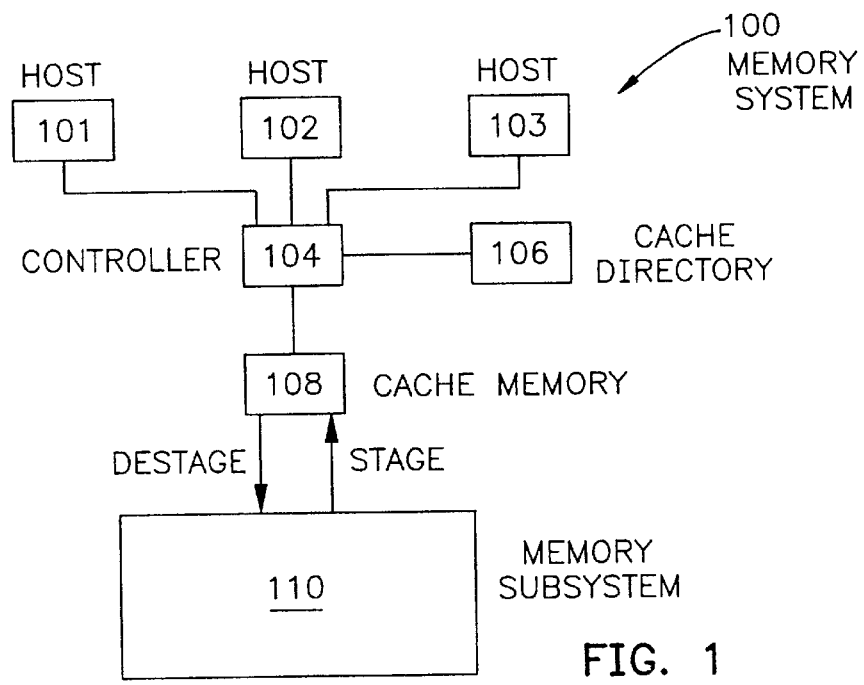
FIG. 1 is a block diagram of the hardware components and interconnections of the invention.

FIG. 1 illustrates an exemplary hardware environment for implementing the invention. Although other arrangements may be used, the illustrated example concerns a memory system 100 including multiple hosts 101–103, a controller 104, a cache memory 108, a cache directory 106, and a memory subsystem 110.

The memory subsystem 110 comprises a non-volatile storage subsystem, accessible to the hosts 101–103 by the controller 104 and cache memory 108. In a preferred embodiment, the memory subsystem 110 comprises a group of magnetic digital data storage disks configured according to RAID-5 architecture.

Figure 2:
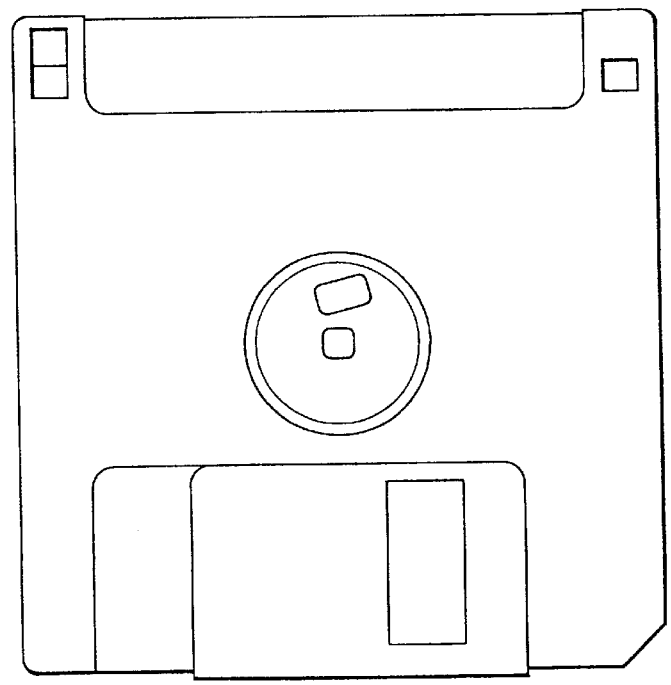
FIG. 2 is a perspective view of an exemplary data storage medium in accordance with the invention.

The subsystem 110 is coupled to the cache memory 108, which preferably comprises a fast-access volatile memory such as RAM. The cache memory 108 is coupled to a controller 104, which maintains the cache memory 108. Preferably, the controller 104 comprises a RISC processor such as the INTEL brand i 960™, or another suitable processing unit. As an alternative, some or all of the functions of the controller 104 may be subsumed by operations of the hosts 101–103. The controller 104 may include or have access to additional data storage (not shown) of its own, for the purpose of storing a sequence of machine-readable programming instructions executed by the controller 104 during operation of the invention as described below. In this respect, such data storage may be provided by a RAM module accessible to the controller, or by a data storage medium such as a computer diskette 200 (FIG. 2). Alternatively, the instructions may also be stored on a DASD array, magnetic tape, conventional "hard drive", electronic read-only memory, optical storage device, paper "punch" cards, or another data storage device. In an illustrative embodiment of the invention, the computer-executable instructions may comprise lines of compiled C++ language code.

In addition to the cache memory 108, the controller 104 is also coupled to the cache directory 106 and the hosts 101–103. Each of the hosts 101–103 comprises a "user" of the memory subsystem 110, such as a mainframe computer, personal computer, workstation, user interface device, memory storage device, another cache process, or another suitable system user.

OPERATION

Operation of the system 100 is performed according to a process aspect of the invention, described as follows.

Parts & Part Status

As mentioned above, the invention contemplates multiple track parts ("parts"), each part providing a cache representation of one or more records of a track stored on disk. A part may represent some or all data fields of the records it represents. Multiple parts existing in cache may include parts of the same logical track; however, it is possible for a track to be only partially represented in cache. One advantage of the invention is that the cache may contain multiple parts containing portions of the same logical track.

The provision of multiple parts supports concurrent access to data associated with a track by multiple operations or "processes". Namely, each part is assigned one status from a predetermined catalog of recognized statuses, thus establishing the permissible manner of accessing that part. Depending upon a part's status, the part may be used by one process (e.g. Read) or by multiple processes concurrently (e.g. Read and Destage). Other part statuses dedicate a part to a single process (e.g. Write).

Following is an exemplary catalog of part statuses, illustrating one embodiment of the invention.

A. Primary

This status denotes a part that has been staged into the cache 108, but has not been modified while cached. Alternatively, the Primary part may contain modified data that has been marked as unmodified following destage completion. The Primary part may be used to satisfy host Read requests, for example.

B. Stage

This status identifies a part that is in the process of being staged into the cache 108.

C. Primary-Write

This status concerns a part that is in the process of being modified, i.e. being written to by one of the hosts 101–103 via the controller 104.

D. Primary-Modified

This status denotes a part that has been modified after it was staged to cache. During the process of writing to a part, the part is Primary-Write; following the writing operation, the part assumes Primary-Modified status.

E. Primary-Modified-Merge-Pending

This status describes a Primary-Modified part that has been slated for merging with another part. Merging operations are discussed in greater detail below.

F. Destage-Pending

This status attaches to a modified part that has been slated for future destaging, although the destaging operation has not yet begun.

G. Primary-In-Destage

This status refers to a modified part that is undergoing the process of being destaged to the memory subsystem. 110. As discussed above, after a Primary part has been modified, it becomes a Primary-Modified part; then, before the process of destaging this part, the part becomes Destage-Pending. Subsequently, during the destage operation, the part assumes Primary-In-Destage status.

H. Previous

This status concerns a part that is maintained in the cache 108 for the purpose of supporting parity operations. After a part is modified in the cache 108 it becomes a Primary-Modified part. The original (unmodified) version of that part is maintained in the cache 108 as a Previous status part. This part is used in non-failure situations to allow parity to be updated in accordance with new data without having to read the old data from the memory subsystem 110, thereby improving performance. In particular, the new parity is computed as shown in Equation 1, below:

$$\text{New Parity} = (\text{Old Parity}) \; XOR \; (\text{New Data}) \; XOR \; (\text{Old Data}) \quad [1]$$

where: "Old Parity" represents the existing parity computation, to be updated by the "New Parity";

"New Data" represents the new part, an update of an old part; and

"Old data" represents the old part which is being updated by the New Data, and is represented in cache memory by a Previous status part.

Therefore,, whenever a cached part is updated, the part is retained in cache as a Previous status part to avoid the need to access the memory subsystem 110 when computing new parity for the updated part.

I. Previous-In-Destage

This status, like the Previous status, concerns a part that is maintained in the cache 108 for the purpose of supporting parity operations. When a modified part is undergoing destaging to the cache 108 it becomes a Primary-In-Destage part. The original (unmodified) version of that part is maintained in the cache 108 as a Previous-In-Destage status part during this time. Before the process of destaging the part, the part is merely Previous status; during the destage operation, the Previous part assumes Previous-In-Destage status.

As described above, the present invention provides a catalog of allowable part statuses used in maintaining cache consistency. The nature and significance of these part statuses will become more apparent with the following description of the procedures for managing and consolidating parts.

Part Attributes

In addition to a status as listed above, each cached part may have certain attributes. For example, each part may include a "number-of-users" attribute, indicating the number of different users (e.g. the hosts 101–103) that are currently accessing the part. If a part's number-of-users attribute is non-zero, the part is considered to be "busy."

Write

Figure 3:
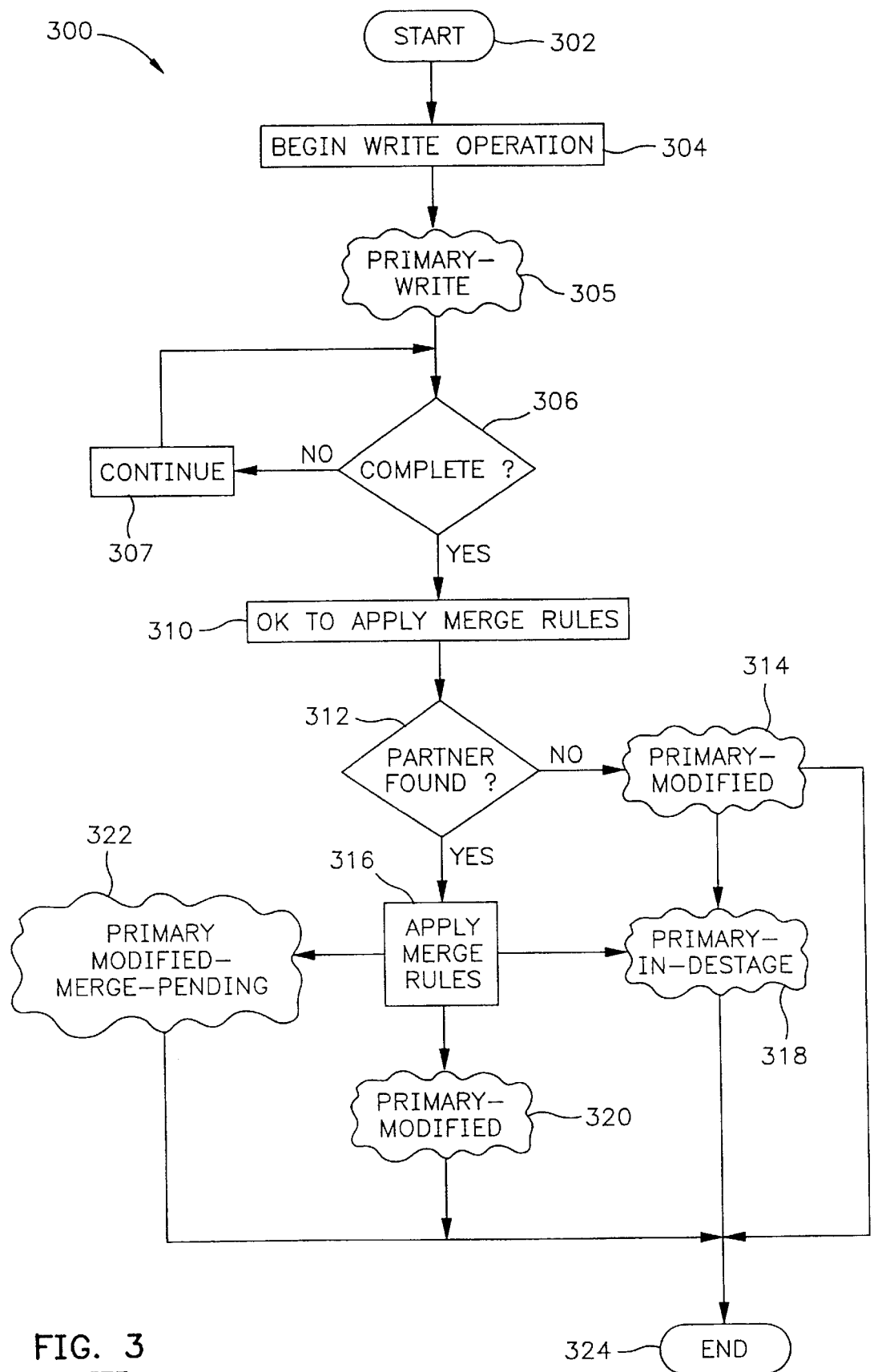
FIG. 3 is a flowchart of a write routine pursuant to the invention.

FIG. 3 depicts a sequence 300 of tasks for performing Write operations in a hardware environment such as the system 100, using the catalog of part statuses described above. In this context, "Write" operations involve making modifications to cached data. Thus, the sequence 300 is performed whenever a user (e.g. one of the hosts 100–103) initiates an attempt to modify data contained in the cache 108.

The user begins the routine 300 in task 302 by issuing a Write request accompanied by an identification of one or more data parts to be written. Then, in task 304, the controller 104 begins to write the data parts to the cache 108. One advantage of the invention is that host Write operations are not inhibited at any time; namely, data is immediately written to the cache 108, with consolidation by merging being performed later if possible.

In response to task 304, the controller 104 in task 305 places the parts-to-be-written in Primary-Write status. Then, the controller 104 in query 306 asks whether the operation of writing the data parts to the cache 108 is complete. If not, the writing continues in task 307.

After an affirmative answer to query 306, performance of the merge rules is permitted, as shown by task 310. Parts being considered for possible merger are referred to as "candidate" parts. For each Primary-Write candidate data part, the controller 104 in query 312 asks whether there are any "partners". A "partner" refers to another data part that represents one or more records from the subsystem 110 that are also represented by the candidate data part. For example, the partner and candidate may concern a completely identical parcel of data, or the partner and candidate parts may represent records in common while also representing non-overlapping data records. Searching for partner parts is performed because there is a possibility that the candidate and partner may be merged to operate the cache 108 more efficiently.

If no partner for the candidate part is found, the candidate data part is changed from Primary-Write to Primary-Modified status in task 314. Following task 314, the routine 300 ends in task 324.

If query 312 finds a partner for the candidate, however, it may be possible to consolidate parts by merging the candidate with the partner. Therefore, the controller 104 in task 316 applies certain merge rules, discussed in greater detail below. The result of applying these merge rules may be creation of a Primary-Modified-Merge-Pending part (task 322), a Primary-Modified part (task 320), or a Primary-In-Destage part (task 318). After applying the merge rules, the routine 300 ends in task 324.

Write Merge Rules

As stated above, the Write operation merge rules seek to combine a candidate Primary-Write part with a partner of another status. To perform a merge operation, the candidate and partner must both be non-busy, i.e. having a number-of-users attribute equal to zero. If one or both parts are busy, the process may wait until both parts are non-busy.

The manner of merging the two parts depends upon the status of the partner, as shown below.

1. Primary-Modified

If the partner is a Primary-Modified part, the candidate and partner are merged, and the resultant part is given Primary-Modified status.

2. Primary-Modified-Merge-Pending

If the partner is a Primary-Modified-Merge-Pending part, no merging action is taken immediately. However, the candidate is given Primary-Modified-Merge-Pending status pending a subsequent merge with the partner part. Later, after the first merge operation completes, the candidate is merged with the newly merged part to form a consolidated Primary-Modified part.

3. Primary-In-Destage

If the partner is a Primary-In-Destage part, no merging action is taken. The candidate part's status is changed to Primary-Modified. Potential merging, if any, between the candidate and partner parts will be accomplished next time the merge rules are applied.

4. Destage-Pending

If the partner is a Destage-Pending part, the candidate and partner are merged to yield a consolidated pan having Primary-In-Destage status.

5. Primary

If the partner is a Primary part, the candidate and partner are merged to yield a consolidated part having Primary-Modified status. A copy of the partner is made in the cache 108 and given the Previous status to preserve the ability to perform parity reconstruction of the corresponding data.

6. Stage

If the partner is a Stage part, no merging action is taken immediately. The candidate part, however, is slated for merging with the partner after its staging is complete, whereupon the combined part will be given Primary-Modified status. In the mean time, the candidate part assumes Primary-Modified-Merge-Pending status.

7. Previous-In-Destage

If the partner is a Previous-In-Destage part, no merging action is taken. The candidate part's status is changed to Primary-Modified.

8. Previous

If the partner is a Previous part, no merging action is taken. The candidate part's status is changed to Primary-Modified.

9. Primary-Write

For a Primary-Write candidate, the status is not valid for potential partners, i.e. it cannot exist. Only one Primary-write part can exist at one time.

Destage

Figure 4:
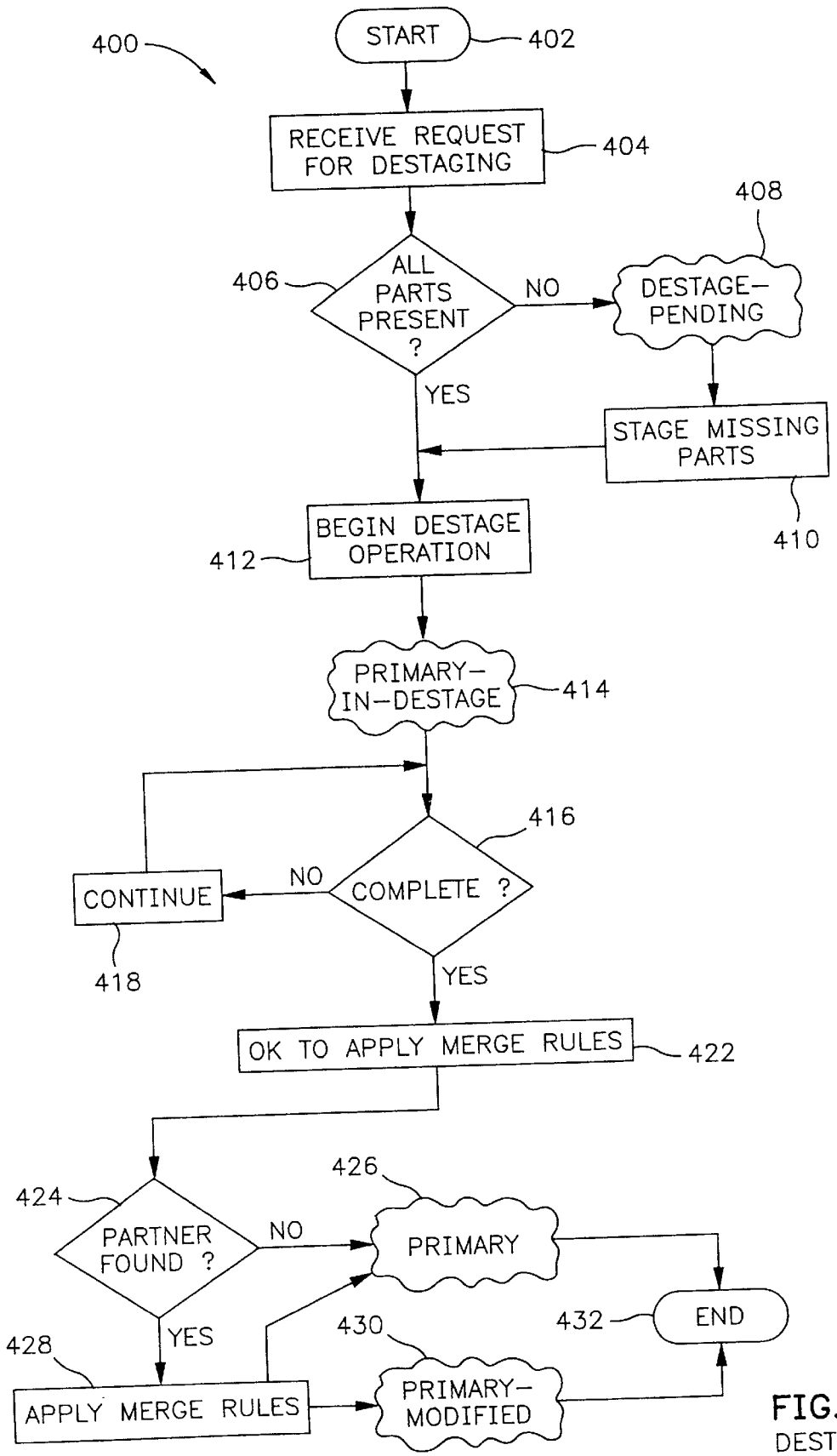
FIG. 4 is a flowchart of a destage routine pursuant to the invention.

FIG. 4 depicts a sequence 400 of tasks for performing Destage operations in a hardware environment such as the system 100, using the catalog of part statuses described above. Generally, "Destage" operations concern data stored in the cache 108 that has been modified after it was originally copied (i.e. "staged") into the cache 108 from the memory subsystem 110. More particularly, destage operations involve writing this modified data back to the subsystem 110 to update the subsystem 110. Generally, unmodified records are not destaged unless they are needed to connect two more disjoint parts containing modified data.

The user begins the routine 400 in task 402 by issuing a Destage request accompanied by an identification of one or more data parts to be destaged. The controller 104 receives the user's request in task 404. The controller 104 in query 406 asks whether all identified parts are present in the cache 108. If not, the identified parts present in the cache 108 are given Destage-Pending status in task 408, and the missing parts are staged in task 410. The Stage routine 500 (FIG. 5) is described in greater detail below.

After all parts identified in task 404 are present, being either initially present or present after staging in task 410, the controller 104 in task 412 begins destaging the parts to the subsystem 110. Accordingly, in task 414 the controller 104 assigns these parts Primary-In-Destage status.

In query 416, the controller 104 asks whether the destage operation is complete. If not, destaging continues in task 418. Otherwise, when all data parts have been successfully written to the subsystem 110, performance of the merge rules is permitted, as shown by task 422. First, the controller 104 in query 424 asks whether, for each Primary-In-Destage "candidate" data part, there is a partner part in cache 108. As mentioned above, searching for partner parts is performed because there is a possibility that the candidate and partner may be merged to operate the cache 108 more efficiently.

If no partner for the candidate part is found, the candidate data part is made a Primary status part, as shown by task 426. Following task 426, the routine 400 ends in task 432. If query 424 finds a partner for the candidate, however, it may be possible to consolidate parts by merging the candidate with the partner. Therefore, the controller 104 in task 428 applies certain merge rules, discussed in greater detail below. The result of applying these merge rules may be creation of a Primary part (task 426) or a Primary-Modified part (task 430). After applying the merge rules, the routine 400 ends in task 43).

Destage Merge Rules

As stated above, the Destage operation merge rules seek to combine a candidate Primary-In-Destage part with a partner of another status. To perform a merge operation, the candidate and partner must both be non-busy, i.e. having a number-of-users attribute equal to zero. If one or both parts are busy, the process may wait until both parts are non-busy.

The manner of merging the two parts depends upon the status of the partner, as shown below.

1. Primary-Write

If the partner is a Primary-Write part, no merging action is taken. The Primary-In-Destage candidate is switched to Primary status.

2. Primary-Modified

If the partner is a Primary-Modified part, the candidate and partner are merged, and the resultant part is given Primary-Modified status. Any displaced data is used to generate a part in the cache 108 with Previous status, to preserve the ability to assist in parity construction of the corresponding data.

3. Primary-Modified-Merge-Pending

If the partner is a Primary-Modified-Merge-Pending part, no merging action is taken. The Primary-In-Destage candidate is switched to Primary status.

4. Primary-In-Destage

For a Primary-In-Destage candidate, this status is not valid for potential partners, i.e. it cannot exist. Only one Primary-In-Destage part can exist at one time.

5. Destage-Pending

For a Primary-In-Destage candidate, this status is not valid, i.e. cannot exist.

6. Primary

If the partner is a Primary part, the candidate and partner are merged to yield a consolidated part having Primary status. Any overlapping data is discarded. A copy of the partner is made in the cache 108 and given the Previous status to preserve the ability to perform parity reconstruction of the corresponding data.

7. Stage

For a Primary-In-Destage candidate, this is not a valid status for potential partners.

8. Previous-In-Destage

If the partner is a Previous-In-Destage part, no merging action is taken, but the partner is deleted.

9. Previous

If the partner is a Previous part, no merging action is taken. The candidate part's status is changed to Primary.

Stare

Figure 5:
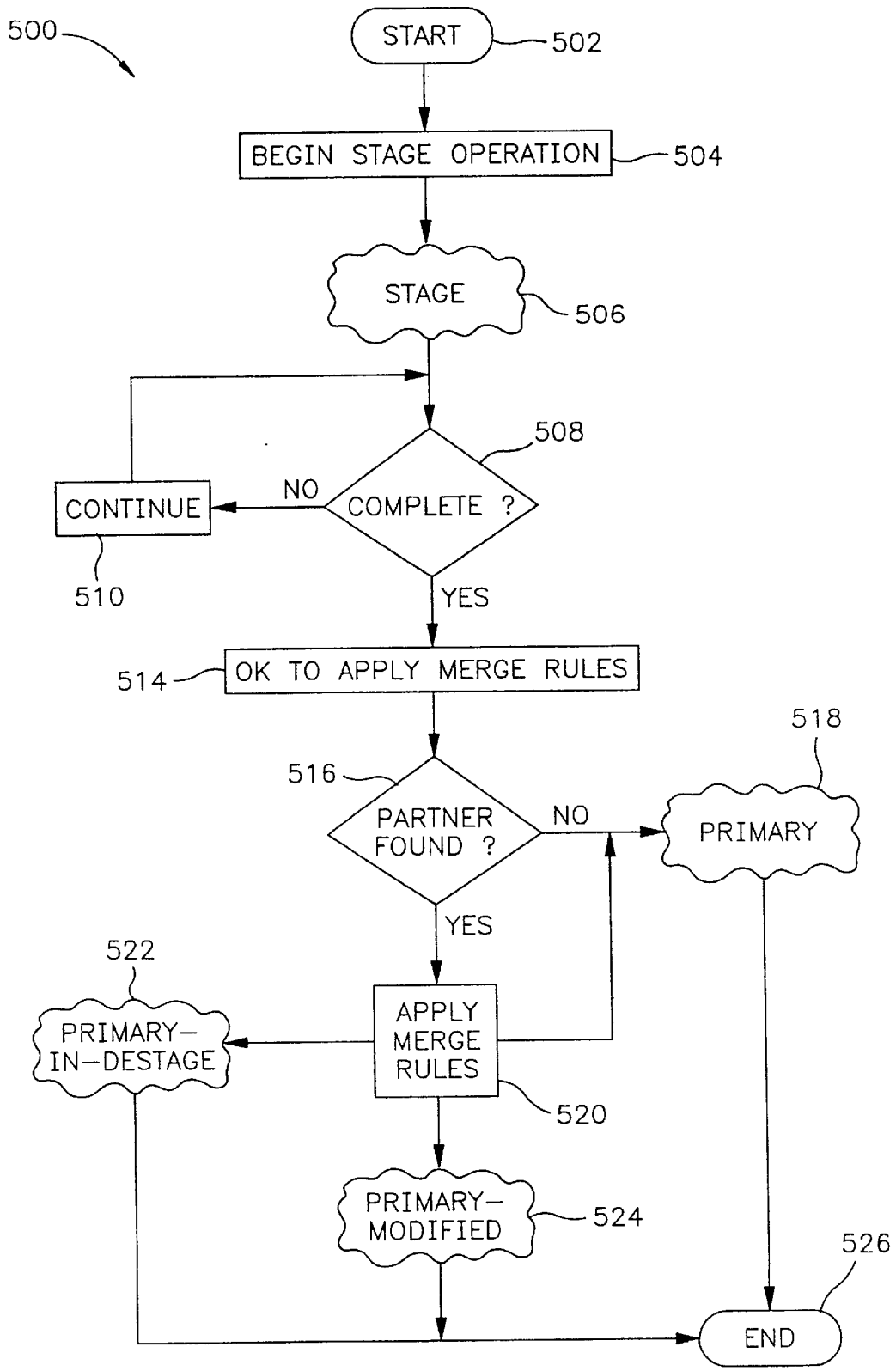
FIG. 5 is a flowchart of a stage routine pursuant to the invention.

FIG. 5 depicts a sequence 500 of tasks for performing Stage operations in a hardware environment such as the system 100, using the catalog of part statuses described above. Generally, "Stage" operations are performed to copy data from the subsystem 110 into the cache 108, such as in response to a Read-miss.

The Stage routine 500 is initiated in task 502 in response to a Read-miss or another request for data from the subsystem 110 that is not present in the cache 108. This data consists of one or more identified data parts. The controller 104 in task 502 begins the Stage procedure, and in task 506 designates the identified data parts as Stage status parts.

In query 508, the controller 104 asks whether the Stage operation is complete. If not, staging continues in task 510. Otherwise, when all data parts have been successfully copied to cache 108 from the subsystem 110, performance of the merge rules is permitted as shown by task 514.

First, the controller 104 in query 516 asks whether, for each Primary "candidate" data part, there is a partner part in cache 108. As mentioned above, searching for partner parts is performed because there is a possibility that the candidate and partner may be merged to operate the cache 108 more efficiently.

If no partner for the candidate part is found, the candidate data part becomes a Primary status part, as shown by task 518. Following task 518, the routine 500 ends in task 526.

If query 516 finds a partner for the candidate, however, it may be possible to consolidate parts by merging the candidate with the partner. Therefore, the controller 104 in task 520 applies certain merge rules, discussed in greater detail below. The result of applying these merge rules may be creation of a Primary part (task 518), a Primary-In-Destage part (task 522), or a Primary-Modified part (task 524). After applying the merge rules, the routine 500 ends in task 526.

Stage Merge Rules

As stated above, the Stage operation merge rules seek to combine a candidate Stage part with a partner of another status. To perform a merge operation, the candidate and partner must both be non-busy, i.e. having a number-of-users attribute equal to zero. If one or both parts are busy, the process may wait until both parts are non-busy.

The manner of merging the two parts depends upon the status of the partner, as shown below.

1. Primary-Write

If the partner is a Primary-Write part, no merging action is taken since the Primary-Write part is undergoing a write operation. However, the candidate is given Primary status.

2. Primary-Modified

If the partner is a Primary-Modified part, the candidate and partner are merged, and the resultant part is given Primary-Modified status. Any overlapping data is used to generate a Previous status part.

3. Primary-Modified-Merge-Pending

If the partner is a Primary-Modified-Merge-Pending part, the candidate and partner are merged, and the resultant part is given Primary-Modified status. Any overlapping data is used to generate a Previous status part.

4. Primary-In-Destage

If the partner is a Primary-In-Destage part, no merging action is taken. The candidate part's status is changed to Primary.

5. Destage-Pending

If the partner is a Destage-Pending part, the candidate and partner are merged, with the resulting part comprising a Primary-In-Destage part.

6. Primary

If the partner is a Primary part, the candidate and partner are merged to yield a consolidated part having Primary status.

7. Stage

For a Stage candidate, this status is not a valid status for potential partners.

8. Previous-In-Destage

If the partner is a Previous-In-Destage part, no merging action is taken. The candidate part's status is changed to Primary.

9. Previous

If the partner is a Previous part, no merging action is taken. The candidate part's status is changed to Primary.

Read

Figure 6:
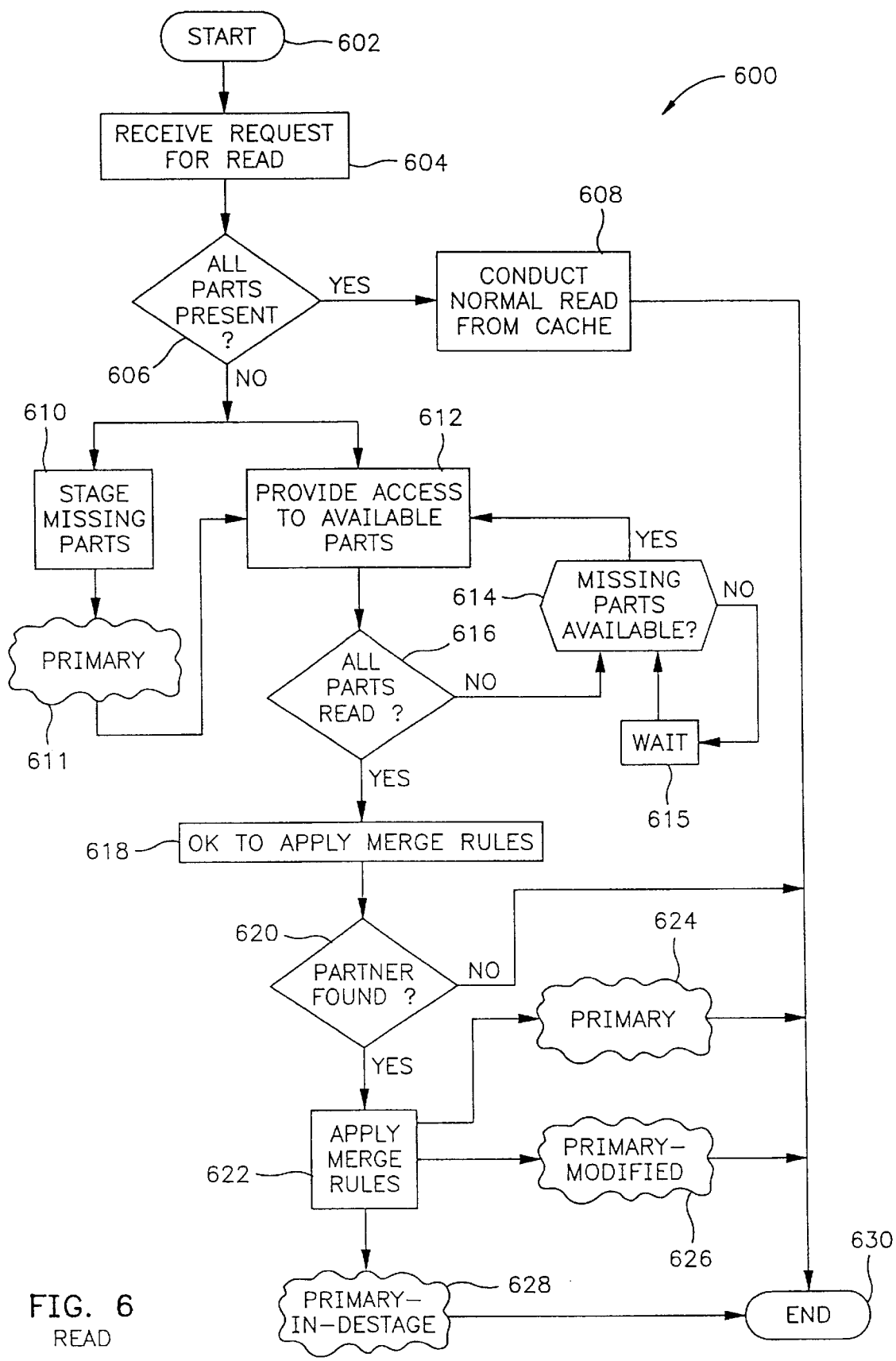
FIG. 6 is a flowchart of a read routine pursuant to the invention.

FIG. 6 depicts a sequence 600 of tasks for performing Read operations in a hardware environment such as the system 100, using the catalog of part statuses described above. In this context, "Read" operations involve reading data from the cache 108 or the subsystem 100. Thus, the sequence 600 is performed whenever a user (e.g. one of the hosts 100–10) initiates an attempt to read data from the subsystem 110, some, all, or none of this data may already be stored in the cache 108.

The user begins the routine 600 in task 602 by issuing a Read request accompanied by an identification of one or more data parts to be read. After the controller 104 receives the Read request in task 604, query 606 asks whether all identified parts are present in the cache 108. If so, the controller 104 conducts a normal Read operation, simply reading each requested data part from the cache 108.

If the cache 108 does not already contain all identified parts, however, the controller 104 initiates tasks 610 and 612 in parallel. In task 610, the controller 104 stages the missing parts; this may be achieved using the Stage routine 500 described above. Reading of these parts constitutes "Read-misses", because the parts are not already contained in the cache 108. When they are staged to cache 108, the staged parts are made available to the user.

Concurrently with task 610, the controller 104 in task 612 provides the user with access to the available parts, i.e. the parts already contained in the cache 108. Accordingly, reading of these constitutes "Read-hits". For each requested part, the controller 104 supplies the user with the "highest-ranked" part contained in cache 108, irrespective of the parts' number-of-users attribute. The ranking of a given part relative to other parts is based upon the parts' statuses, as ranked in Table 1, below.

TABLE 1

| Part Ranking | Part Rankings Part Status |
| --- | --- |
| 1 | Primary-Write |
| 2 | Primary-Modified |
| 3 | Primary-Modified-Merge-Pending |
| 4 | Primary-in-Destage |
| 5 | Destage-Pending |
| 6 | Primary |
| 7 | Stage |
| 8 | Previous |
| 9 | Previous-in-Destage |

Thus, for example, if Primary-Modified, Destage-Pending, and Primary versions of a part exist in the cache 108, the controller 104 in task 612 provides a Read-hit output of the Primary-Modified part.

In query 616, the controller 104 asks whether all parts have been effectively read. If not, the controller in query 614 asks whether the missing parts are available, i.e. have been staged yet. If not, task 615 waits for a predetermined length of time. When query 614 finds that the missing parts are available, task 612 provides the user with access to these parts. The staged parts are given Primary status, as shown by task 611.

When query 616 determines that all identified parts have been read, performance of the merge rules is permitted, as shown by task 618. First, for each "candidate" data part, the controller 104 in query 620 asks whether there are any partners, where a "partner" refers to another data part that pertains to some of the same data from the subsystem 110 as the candidate data part. If no partner for the candidate part is found, the status of the candidate data part is not changed, as shown by the advancement of query 620 to task 630.

If query 620 finds a partner for the candidate, however, it may be possible to consolidate parts by merging the candidate with the partner. Therefore, the controller 104 in task 622 applies certain merge rules, discussed in greater detail below. The result of applying these merge rules may be creation of a Primary part (task 624), a Primary-Modified part (task 626), or a Primary-In-Destage part (task 628). After applying the merge rules, the routine 600 ends in task 630.

Read Merge Rules

As stated above, the Read operation merge rules seek to combine a candidate part with a partner of the same or another status. To perform a merge operation, the candidate and partner must both be non-busy, i.e. having a number-of-users attribute equal to zero. If one or both parts are busy, the process may wait until both parts are non-busy.

The candidate part may have any status possible, i.e. Primary-Write, Primary-Modified, Primary-Modified-Merge-Pending, Primary-In-Destage, Destage-Pending, Primary, Stage, Previous, or Previous-In-Destage. Thus, the manner of merging the candidate and partner depends upon the status of both parts, as shown below.

1. Primary-Write Candidate

With Read operations, a Primary-Write candidate cannot exist.

2. Primary-Modified Candidate

A. Primary-Modified Partner

If the partner and candidate are Primary-Modified parts, the candidate and partner are merged, and the resultant part is given Primary-Modified status.

B. Primary-Modified-Merge-Pending Partner

If the candidate is Primary-Modified while the partner is a Primary-Modified-Merge-Pending part, no merging action is taken immediately. However, the candidate is given Primary-Modified-Merge-Pending status pending a subsequent merge with the partner part. Later, after the first merge operation completes, the candidate is merged with the newly merged partner part to form a consolidated Primary-Modified part.

C. Primary-In-Destage Partner

If the candidate is Primary-Modified while the partner is a Primary-In-Destage part, no merging action is taken. The candidate part's status remains Primary-Modified. Potential merging, if any, between the candidate and partner parts will be accomplished next time the merge rules are applied.

D. Destage-Pending Partner

If the candidate is Primary-Modified while the partner is a Destage-Pending part, no merging action is taken. The candidate part's status remains Primary-Modified. Potential merging, if any, between the candidate and partner parts will be accomplished next time the merge rules are applied.

E. Primary Partner

If the candidate is Primary-Modified while the partner is a Primary part, the candidate and partner are merged to yield a consolidated part having Primary-Modified status. A copy of the partner is made in the cache 108 and given the Previous status to preserve the ability to perform parity reconstruction of the corresponding data.

F. Stage Partner

If the candidate is Primary-Modified while the partner is a Stage part, no merging action is taken immediately. The candidate part, however, is slated for merging with the partner; after the partner's staging is complete, the combined part will be given Primary-Modified status. In the mean time, the candidate part assumes Primary-Modified-Merge-Pending status.

G. Previous-In-Destage Partner

If the candidate is Primary-Modified while the partner is a Previous-In-Destage part, no merging action is taken. The candidate part's status is changed to Primary-Modified.

H. Previous Partner

If the candidate is Primary-Modified while the partner is a Previous part, no merging action is taken. The candidate part's status is changed to Primary-Modified.

I. Primary-Write Partner

No merging action is taken here. The candidate part retains Primary-Modifier status.

3. Primary-Modified-Merge-Pending Candidate

With Read operations, a Primary-Modified-Merge-Pending candidate cannot exist. Therefore, this combination is invalid.

4. Primary-In-Destage Candidate

In this case, no merging action is taken. The candidate retains Primary-In-Destage status.

5. Destage-Pending Candidate

With Read operations, a Destage-Pending candidate cannot exist. Therefore, this combination is invalid.

6. Primary Candidate

A. Primary-Write Partner

In this case, no merging action is taken. The candidate retains Primary status.

B. Primary-Modified Partner

Here, the candidate and partner are merged, with the resulting consolidated part assuming Primary-Modified. Any overlapping data becomes a Previous status part.

C. Primary-Modified-Merge-Pending Partner

No merging action is taken here. The candidate part retains Primary status.

D. Primary-In-Destage Partner

No merging action is taken here. The candidate part retains Primary status.

E. Destage-Pending Partner

No merging action is taken here. The candidate part retains Primary status.

F. Primary Partner

Here, the candidate and partner are merged, with the resulting consolidated part assuming Primary status. Any overlapping data is discarded.

G. Stage Partner

No merging action is taken here. The candidate part retains Primary status.

H. Previous-In-Destage Partner

No merging action is taken here. The candidate part retains Primary status.

I. Previous Partner

No merging action is taken here. The candidate part retains Primary status.

7. Stage Candidate

In this case, no merging action is taken. The candidate retains Stage status until its Stage operation completes, as discussed above.

8. Previous Candidate

With Read operations, a Previous candidate cannot exist.

9. Previous-In-Destage Candidate

With Read operations, a Previous-In-Destage candidate cannot exist.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method of providing multiple users with concurrent access to stored data, comprising the steps of:

receiving a user request to modify a first data part, said first data part being stored in cache memory and corresponding to a first data item stored in nonvolatile memory;

storing in cache memory a second data part comprising a modified version of the first data part; and after completion of the storing step, applying a predetermined set of merge rules to consolidate the second data part with other data parts contained in the cache memory that correspond to the first data item.

2. The method of claim 1, the step of applying the predetermined set of merge rules comprising the steps of:

locating a partner data part contained in the cache memory that corresponds to the first data item; and determining whether the partner is undergoing destaging to nonvolatile storage or staging from nonvolatile storage, and if not, merging the partner with the modified data part.

3. The method of claim 1, further comprising the steps of:

receiving a user request to destage the first data part by copying the first data part from cache memory to nonvolatile memory; and concurrently with the storing step, copying the data part from cache memory to nonvolatile memory.

4. The method of claim 3, wherein the copying step further includes steps of making the data part unavailable to other processes during said copying.

5. A method of writing data to storage, said method comprising the steps of:

receiving a request to modify an original data item in a storage subsystem;

staging the original data item to a cache memory to create a data part;

initially assigning the data part a Primary-Write status;

modifying the data part;

changing the data part's status to Primary-Modified status; and applying predetermined merge rules to merge the data part with other data parts corresponding to the original data part.

6. A method of destaging data from a cache memory to storage, said method comprising the steps of:

receiving a request to destage a data part from cache memory to storage, said data part corresponding to an original data part contained in nonvolatile storage;

determining whether the data part is present in the cache memory, and if not staging the missing data part from storage to cache memory;

initially assigning the data part in cache memory a Destage-Pending status;

initiating destaging of the data part to storage and changing the data part's status to Primary-In-Destage;

completing destaging of the data part to storage thereby updating the original data part in nonvolatile storage;

applying predetermined merge rules to merge the data part with other data parts corresponding to the original data part; and changing the data part's status.

7. A method of staging data from storage to a cache memory, said method comprising the steps of:

receiving a request to stage an original item of data from storage to cache memory;

initiating staging of the original data item to cache memory to initiate creation of a data part, and during staging assigning the data part in cache memory a Stage status;

completing staging of the data item from storage to cache memory to create the data item;

applying predetermined merge rules to merge the data part with other data parts corresponding to the original data item; and changing the data part's status to Primary.

8. A method for a user to read data from a storage system, said method comprising the steps of:

maintaining in cache memory multiple different data parts corresponding to original data items contained in nonvolatile storage in response to write, destage, and stage processes, and ranking all data parts corresponding to a common data item with respect to each other;

receiving a request to read a data block including multiple data items contained in nonvolatile storage and identified by the request;

for each identified data item, determining whether the identified data item has at least one corresponding data part present in the cache memory, and if so, providing an output of a highest ranked data part corresponding to the identified data item from cache memory to the user;

otherwise, staging the data item from nonvolatile storage to cache memory and providing an output of the staged data item to the user;

applying predetermined merge rules to merge data parts corresponding to the data block; and re-ranking the merged data parts.

9. A method of accessing data in a storage system, comprising the steps of:

maintaining in cache memory multiple different parts corresponding to original data items contained in nonvolatile storage in response to write, destage, and stage processes, and ranking each data part corresponding to a common data item with respect to each other;

receiving from a first host a request to modify a first original data item; said first original data item being represented in cache by a first data part;

receiving from a second host a request to destage the first part;

in response to the request to modify, recognizing that the first original data item is represented in cache memory by the first data part, and then initiating creation of a modified version of the first data part in cache memory separate from the first data item; and concurrently with the initiating step, initiating destaging of the first data part by commencing copying of the first data part to the storage.

10. A method of providing multiple processes with concurrent data access to stored data comprising the steps of:

maintaining, multiple data items in a nonvolatile storage medium;

in response to different storage operations, maintaining multiple data parts in a cache memory corresponding to each data item;

maintaining, for each data item, a listing of ranked status for the corresponding data parts;

receiving a request from one of the processes for access to a specified data item;

consulting the listing to identify all parts corresponding to the requested data item;

identifying in response to the request one of the data parts having a predetermined relationship in status to the other data parts; and providing the requesting user with access to the identified data part while making all remaining data parts corresponding to the specified data item available to other processes.

11. The method of claim 10, further comprising the steps of merging selected data parts corresponding to the specified data item.

12. The method of claim 10, the nonvolatile storage medium comprising a RAID array.

13. The method of claim 10, the nonvolatile storage medium comprising a hard disk drive.

14. The method of claim 10, the nonvolatile storage medium comprising at least one optical disk.

15. The method of claim 10, the nonvolatile storage medium comprising at least one magnetic recording disk.

16. The method of claim 10, the nonvolatile storage medium comprising at least one optical tape.

17. The method of claim 10, the nonvolatile storage medium comprising at least one magnetic recording tape.

18. A method of providing multiple processes with concurrent data access to stored data, comprising the steps of:

maintaining a first data item in a nonvolatile storage medium;

staging to the first item of data in a cache memory to create a first data part;

creating a second data part in cache memory comprising a modified version of the first data part;

in response to a destage request, initiating an operation to destage the second data part to the nonvolatile storage medium;

during the destage operation, receiving a write request to modify the first data item, and in response to the request, creating a third data part in cache memory duplicating the second data part and then modifying the third data part in accordance with the write request.

19. A method of providing multiple processes with concurrent data access to stored data, comprising the steps of:

maintaining in cache memory different data parts corresponding to an original data item contained in nonvolatile storage, and ranking the data parts relative to each other;

in response to a destage request, initiating an operation to destage a first one of the data parts to the nonvolatile storage medium;

during the destage operation, receiving a Read request to read the original data item; and in response to the Read request, identifying a highest ranked data part corresponding to the original data item and providing an output of the identified data part from the cache memory.

20. The method of claim 19, further comprising the steps of applying predetermined merge rules to merge all data parts corresponding to the original data item, and then re-ranking all data parts, including the merged data parts, that correspond to the original data item.

21. The method of claim 19, wherein the step of initiating an operation to destage the first data part further comprises the steps of temporarily changing the ranking of the first data part during the destage operation.

22. A method of providing multiple processes with concurrent data access to stored data, comprising the steps of:

maintaining in cache memory different data parts corresponding to an original data item contained in nonvolatile storage, and ranking the data parts relative to each other;

in response to a destage request, initiating an operation to destage a first one of the data parts to the nonvolatile storage medium;

during the destage operation, receiving a Read request to read a data block including multiple items that are contained in nonvolatile storage and identified by the request, said data items including the original data item; and in response to the Read request, for each identified data item, determining whether the identified data item has at least one corresponding data part present in the cache memory, and if so, providing an output for each identified data item of a highest ranked corresponding data part from cache memory to the user;

otherwise, staging the data item from nonvolatile storage to cache memory and providing an output of the staged data item.

23. The method of claim 22, further comprising the steps of applying predetermined merge rules to merge data parts corresponding to the data block, and re-ranking the merged data parts.

* * * * *